United States Patent
Smeets et al.

(10) Patent No.: US 8,321,689 B2
(45) Date of Patent: Nov. 27, 2012

(54) WATERMARKING COMPUTER CODE BY EQUIVALENT MATHEMATICAL EXPRESSIONS

(75) Inventors: Bernard Smeets, Dalby (SE); Björn Johansson, Lund (SE)

(73) Assignee: Telefonaktiebolaget L M Ericsson (Publ), Stockholm (SE)

( * ) Notice: Subject to any disclaimer, the term of this patent is extended or adjusted under 35 U.S.C. 154(b) by 1319 days.

(21) Appl. No.: 11/721,666

(22) PCT Filed: Nov. 24, 2005

(86) PCT No.: PCT/EP2005/012819
§ 371 (c)(1),
(2), (4) Date: Jun. 13, 2007

(87) PCT Pub. No.: WO2006/066698
PCT Pub. Date: Jun. 29, 2006

(65) Prior Publication Data
US 2009/0296922 A1 Dec. 3, 2009

Related U.S. Application Data

(60) Provisional application No. 60/639,203, filed on Dec. 22, 2004.

(30) Foreign Application Priority Data

Nov. 15, 2005 (EP) .................................. 05388098

(51) Int. Cl.
*G06F 21/00* (2006.01)
(52) U.S. Cl. ........ 713/190; 713/176; 713/194; 370/431; 705/58
(58) Field of Classification Search ................... 713/190
See application file for complete search history.

(56) References Cited

U.S. PATENT DOCUMENTS

| 5,745,569 | A  | * | 4/1998  | Moskowitz et al. | ............. | 705/58  |
|-----------|----|---|---------|------------------|---------------|---------|
| 6,218,968 | B1 | * | 4/2001  | Smeets et al.    | ................... | 341/65  |
| 6,556,151 | B1 | * | 4/2003  | Smeets et al.    | ................... | 341/87  |
| 6,668,325 | B1 | * | 12/2003 | Collberg et al.  | ............... | 713/194 |
| 6,728,319 | B1 | * | 4/2004  | Nystrom et al.   | ............... | 375/243 |
| 6,834,343 | B1 | * | 12/2004 | Burns            | ........... | 713/176 |
| 6,891,896 | B1 | * | 5/2005  | Betts            | ............ | 375/264 |
| 2003/0086435 | A1 | * | 5/2003 | Cooley et al.    | ................. | 370/431 |
| 2003/0204727 | A1 | * | 10/2003 | Sasaki          | ............ | 713/176 |
| 2004/0255132 | A1 | * | 12/2004 | Venkatesan et al.| .......... | 713/190 |
| 2006/0059475 | A1 | * | 3/2006 | Augusteijn et al.| ............ | 717/155 |

OTHER PUBLICATIONS

Statistical Analysis of a Linear Algebra Asymmetric Watermarking SCHEME|http://www.gts.tsc.uvigo.es/gpsc/publications/wmark/boato07_icassp.pdf|Boato et al.|2007.*

* cited by examiner

*Primary Examiner* — David Pearson
*Assistant Examiner* — Mahfuzur Rahman

(57) ABSTRACT

A method of embedding information in a computer program code, including a plurality of program statements. The method comprises: parsing the computer program code to identify at least one program statement that includes a first mathematical expression, wherein said first mathematical expression includes at least a first algebraic expression adapted to produce at least one numeric result; generating a modified mathematical expression by performing a predetermined transformation of the first mathematical expression, wherein the modified mathematical expression includes a transformed algebraic expression instead of the first algebraic expression, such that the modified mathematical expression is adapted to produce the same result as the first mathematical expression, and wherein the modified mathematical expression is indicative of at least a part of said information; replacing said first mathematical expression in the identified program statement by the modified mathematical expression.

25 Claims, 2 Drawing Sheets

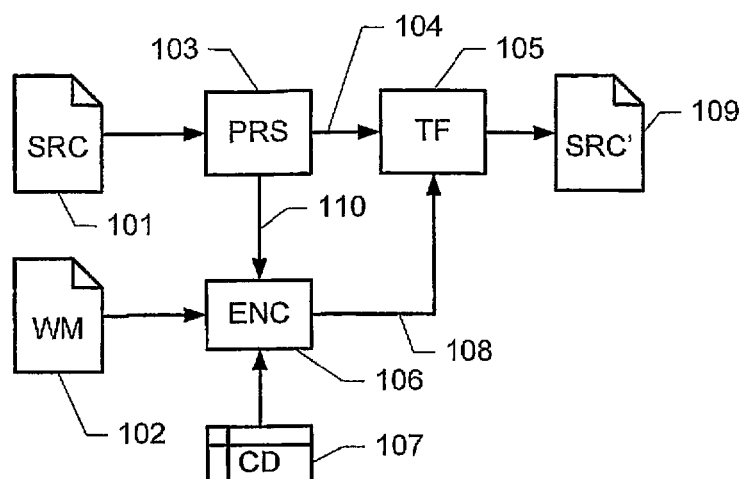
FIG. 1
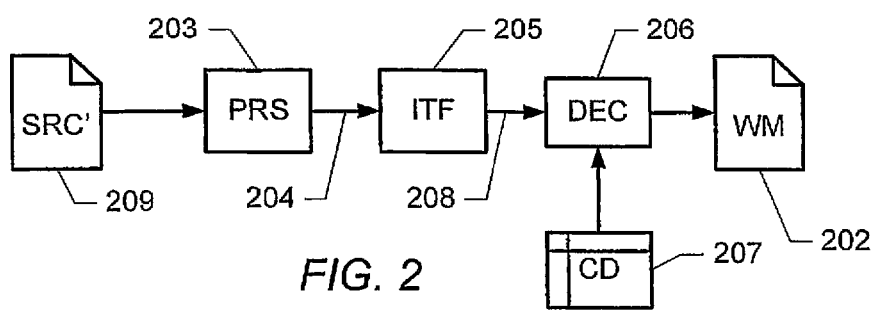
FIG. 2
|  | $E_1$ | $E_2$ | ... | $E_K$ |
|---|---|---|---|---|
| $CW_1$ | $TF_{11}$ | $TF_{12}$ | ... | $TF_{1K}$ |
| $CW_2$ | $TF_{21}$ | $TF_{22}$ | ... | $TF_{2K}$ |
| ... | ... | ... | ... | ... |
| $CW_N$ | $TF_{1N}$ | $TF_{2N}$ | ... | $TF_{NK}$ |
FIG. 3

WATERMARKING COMPUTER CODE BY EQUIVALENT MATHEMATICAL EXPRESSIONS

This application claims the benefit of U.S. Provisional Application No. 60/639,203, filed 22 Dec. 2004, the disclosure of which is fully incorporated herein by reference.

FIELD OF THE INVENTION

The invention relates to the embedding and detection of information, in particular a digital watermark, in computer program code, e.g. source code or object code.

BACKGROUND OF THE INVENTION

It is generally desirable for the manufacturer and/or distributor of software to control the distribution of such software, in particular to be able to protect software against theft, establish/prove ownership of the software, validate software and/or identify/trace copies of distributed software. Hence, efficient techniques for watermarking of computer software, in particular of source code or object code are desirable. The purpose of such watermarking techniques is to add information—a watermark or simply a mark—in the software, e.g. by manipulating/altering or adding program code. The information may be used as a copyright notice, for identification purposes, e.g. to identify the buyer of the software, or the like. It is generally desirable that the information is embedded in such a way that this information cannot be removed by the buyer but that it can be extracted from the software using knowledge about the process that put the mark into the software. In particularly, a watermark is said to be stealthy if the watermark is not easily detectable (e.g. by statistical analysis). A watermark is said to be resilient, if it is able to survive semantic-preserving transformations such as code obfuscation or code optimization, and/or able to survive collision attacks.

In general, a watermark may be subject to different attacks in order to render the mark unrecognisable. Examples of kinds of attacks include:

Additive attacks: New watermarks are added to the code so that the original mark no longer can be extracted, or, to make it impossible to determine which is the original mark.

Distortive attacks: The code is subjected to semantic-preserving transformations such as code obfuscation and code optimization in hope that the watermark will be distorted and not able to be recognized.

Subtractive attacks: The location of the watermark is determined and the mark is cropped out of the program.

Thus, it is a general problem to provide watermarking techniques that yield markings that are robust under such attacks, e.g. by the buyer of the software.

When the embedded watermark is detectable, it can be removed (cropped out) from the program or be replaced by an equivalent expression, which very likely destroys the original mark. In existing solutions embeddings are often easy too identify and thus can be cropped out.

Obfuscation is a technique used to complicate code. Obfuscation makes code harder to understand when it is de-compiled, but it typically has no effect on the functionality of the code. Obfuscation programs can be used to protect programs by making them harder to reverse-engineer. U.S. Pat. No. 6,668,325 discloses a number of code obfuscation techniques, that may be used in a watermarking context.

However, even though the above prior art methods provide a watermarking of computer program code, it remains a problem to provide a watermarking technique that results in watermarks that are more difficult to detect when studying the marked software.

In particular the embedding of watermarks by simple obfuscating changes in the program code, e.g. by renaming of variables, reordering of instructions, loop transformations, etc. involve the problem that they are not sufficiently resilient, since obfuscation techniques typically change exactly these properties, thereby rendering the watermark vulnerable towards an obfuscating attack.

SUMMARY OF THE INVENTION

The above and other problems are solved by a method of embedding information in a computer program code, the computer program code comprising a plurality of program statements, the method comprising:

parsing the computer program code as to identify at least one program statement that includes a first mathematical expression, the program statement being adapted to cause a data processing system to evaluate the mathematical expression as to produce a result; wherein said first mathematical expression includes at least a first algebraic expression adapted to produce at least one numeric result;

generating a modified mathematical expression by performing a predetermined transformation of the first mathematical expression, wherein the modified mathematical expression includes a transformed algebraic expression instead of the first algebraic expression, such that the modified mathematical expression is adapted to produce the same result as the first mathematical expression, and wherein the modified mathematical expression is indicative of at least a part of said information;

replacing said first mathematical expression in the identified program statement by the modified mathematical expression.

By identifying mathematical expressions in the program code and substituting them for equivalent expressions, which can be simplified to the original ones, watermarks are provided that are more difficult to detect. The equivalent expressions included into the code encode the information to be embedded, e.g. a watermark. It is an advantage that mathematical expressions can be transformed into equivalent but considerably more complex expressions, thereby making the expressions hard to find and/or hard to simplify.

The term "program statement" as used herein is intended to include a unit of structuring a programming language, in particular a minimal unit of such structuring. Examples of kinds of statements include definitions, declarations, assignments, conditional statements, loops, and function/procedure calls.

The term "expression" in a programming language as used herein is intended to include a combination of values, variables, and functions, wherein the combination is interpreted according to the particular rules of precedence and of association for a particular programming language, which combination is adapted to produce and return a result, i.e. a value. An algebraic expression produces a numeric result, i.e. a result having a numeric data type, e.g. a floating point data type or an integer data type.

In some embodiments the method comprises generating the transformed algebraic expression by combining an algebraic expression derived from the first algebraic expression with an auxiliary algebraic expression, wherein the auxiliary algebraic expression is indicative of at least a part of said information. Consequently, a simple mechanism of embedding information is provided, as a library/table of different auxiliary algebraic expressions may be stored where each expression encodes respective information.

When the method comprises parsing the first algebraic expression as to identify at least a first variable, and replacing said first variable by a combination, e.g. a linear combination, of at least two variables, a subsequent simplification of the transformed expressions is made more difficult, thereby making the watermark more resilient.

In some embodiments, the first algebraic expression includes at least one variable having an integer data type, and wherein said modified mathematical expression is adapted to produce the same result as the first mathematical expression only for values of said at least one variable that are consistent with said integer data type. In particular, by modifying parts of an expression, e.g. coefficients of a polynomial, such that it only yields the same result for a certain subset of numerical values, the resulting mathematical expression may be made more difficult to simplify, thereby providing a more resilient watermark. When the expression is known only to be evaluated for this subset of values during program execution, the modification does not influence the program execution.

In another embodiment, the identified program statement is adapted to evaluate said first mathematical expression as an integer data type; and wherein said modified mathematical expression is adapted to produce a floating point result that results in the same numerical result as the evaluation of the first mathematical result only when converted into an integer data type.

When the method further comprises encoding the information to be embedded as one or more code words, each code word corresponding to one or more respective predetermined transformations of a mathematical expression, an efficient encoding scheme for embedding a large variety of additional information is provided.

When encoding the information comprises encoding the information using an error correcting code, the resilience of the embedded information is further increased.

In one embodiment, the first mathematical expression includes a comparison of a first and a second algebraic expression adapted to cause a data processing system to compare the results of the first and second algebraic expressions; and generating the modified mathematical expression includes replacing at least one of the first and second algebraic expressions by respective first and second transformed algebraic expressions.

In a further embodiment, the first mathematical expression includes a first condition equivalent to a comparison of a first polynomial with zero; and wherein generating the modified mathematical expression includes replacing the first condition by a comparison of a transformed polynomial with zero, wherein the transformed polynomial is reducible as a product of at least the first polynomial and a second polynomial.

A polynomial is said to be reducible if it can be factored into nontrivial polynomials over the same field. For example, in the field of rational polynomials (i.e., polynomials f(x) with rational coefficients), f(x) is said to be reducible if there exist two non-constant polynomials g(x) and h(x) in x with rational coefficients such that $f(x)=g(x)h(x)$.

In one embodiment, the first mathematical expression includes a first condition equivalent to a comparison of a first polynomial with zero; and wherein generating the modified mathematical expression includes replacing the first condition by a comparison of a transformed polynomial with zero, wherein the transformed polynomial includes an auxiliary variable having a corresponding opaque value determined by a predetermined opaque predicate, and where the transformed polynomial is reducible as a product of at least the first polynomial and a second polynomial only when the auxiliary variable is substituted by its opaque value. Consequently, the risk of substitution attacks is further reduced. For example, the opaque predicates may be chosen from a collection of opaque predicates that has been constructed and stored in advance such that the values of the opaque predicates of the collection are known at watermarking time.

The term "at watermarking time" as used herein is intended to refer to the time at which the embedding system embeds the watermark. Hence, when a property is described as being known, available or controllable at watermarking time, said property is known/available to or controllable by the watermark embedding process that embeds the watermark.

Here, the term opaque predicate refers to a predicate, i.e. a Boolean expression which evaluates to TRUE or FALSE corresponding to "1" and "0", whose outcome is known at watermarking time but is difficult for an adversary to resolve. Accordingly, the term opaque value is intended to refer to the truth value of the opaque predicate.

In particular, when the second polynomial has no real roots, the comparison of the transformed polynomial with zero is guaranteed to always yield the same result as the first condition. Consequently, the program flow is not altered by the introduction of the watermark.

The present invention relates to different aspects including the method described above and in the following, corresponding devices, and computer programs, each yielding one or more of the benefits and advantages described in connection with the above-mentioned methods, and each having one or more embodiments corresponding to the embodiments described in connection with the above-mentioned methods.

In particular, a method of detecting information embedded in a computer program code, the computer program code including a plurality of program statements, comprises:

parsing the computer program code as to identify at least one program statement that includes a first mathematical expression, the program statement being adapted to cause a data processing system to evaluate the mathematical expression as to produce a result; wherein said first mathematical expression includes at least a first algebraic expression adapted to produce at least one numeric result;

performing at least a first one of a predetermined set of transformations of said first mathematical expression, wherein the transformation includes replacing said first algebraic expression with a transformed algebraic expression different from the first algebraic expression;

determining whether said first transformation results in a transformed mathematical expression that produces the same result as the first mathematical expression; and conditioned on said determination extracting at least a part of said embedded information from the first transformation.

In some embodiments, said first mathematical expression is at least part of a program statement that causes, when executed on a data processing system, the data processing system to generate at least one result having a numeric data type or a Boolean data type. In one embodiment, the numeric data type may be a floating point data type or an integer type.

In some embodiments, the first algebraic expression includes a polynomial.

It is noted that the features of the methods described above and in the following may be implemented in software and carried out on a data processing device or other processing means caused by the execution of program code means such as computer-executable instructions. Here and in the following, the term processing means comprises any circuit and/or device suitably adapted to perform the above functions. In particular, the above term comprises general- or special-purpose programmable microprocessors, Digital Signal Processors (DSP), Application Specific Integrated Circuits (ASIC), Programmable Logic Arrays (PLA), Field Programmable Gate Arrays (FPGA), special purpose electronic circuits, etc., or a combination thereof. In particular, in some embodiments, the computer program code into which information is to be embedded or in which embedded information is to be detected is loaded into a memory of a computer, and the steps of the method of embedding or detecting information described herein are automatically performed by said computer.

For example, the program code means may be loaded in a memory, such as a RAM (Random Access Memory), from a storage medium or from another computer via a computer network. Alternatively, the described features may be implemented by hardwired circuitry instead of software or in combination with software.

According to one aspect, a data processing system is suitably configured to perform the steps of the method described above and in the following.

According to another aspect, a computer program product comprises computer-executable instructions adapted to cause, when executed on a data processing system, the data processing system to perform the method described above and in the following.

In some embodiments, the computer program product is embodied as a computer-readable medium having stored thereon the computer-executable instructions. For example, the computer-readable medium may be a compact disc (CD), an optical disc, a diskette, a magnetic storage medium, a memory stick, or the like, that has stored thereon the computer-executable instructions. For example, the computer-readable medium may have stored thereon a software application for embedding a watermark and a software application for detecting a watermark in program code. The software applications may be embodied as separate applications or combined in a single application. In other embodiments, the computer program product is embodied as a data signal, e.g. a suitably modulated carrier signal. For example, the computer-executable instructions may be provided for download from a server computer via a computer network.

In some embodiments, the computer program product comprises a software compiler comprising functionality adapted to cause the data processing system to perform the method described above and in the following as one of a number of compilation passes performed by the compiler. Hence, an integrated software tool for compilation and watermark embedding is provided. Furthermore, since the watermark embedding described herein involves some of the same code analysis techniques for analysing source code as conventional compilers use, the corresponding software functionality may be reused, thereby providing an efficient software implementation.

In yet another aspect, a computer program includes embedded information, embedded therein by the method described herein. In some embodiments, the computer program is embodied as a computer-readable medium having stored thereon the computer program. In other embodiments, the computer program is embodied as a data signal, e.g. a suitably modulated carrier signal.

For the purpose of the present description, the terms storage means and computer-readable medium are intended to comprise any suitable storage medium, device or circuit, e.g. a read-only-memory (ROM), a random access memory (RAM), a flash memory, an Erasable Programmable Read-Only Memory (EPROM), volatile or non-volatile memory, an optical storage device, a magnetic storage device, a diskette, a CD, a hard disk, or the like.

BRIEF DESCRIPTION OF THE DRAWINGS

The above and other aspects will be apparent and elucidated from the embodiments described in the following with reference to the drawing in which:

FIG. 1 shows a schematic block diagram of a watermark embedding process.

FIG. 2 shows a schematic block diagram of a watermark extraction process.

FIG. 3 illustrates a table that relates codewords for encoding a watermark with respective mathematical transformations.

DETAILED DESCRIPTION OF PREFERRED EMBODIMENTS

Figure 4A:
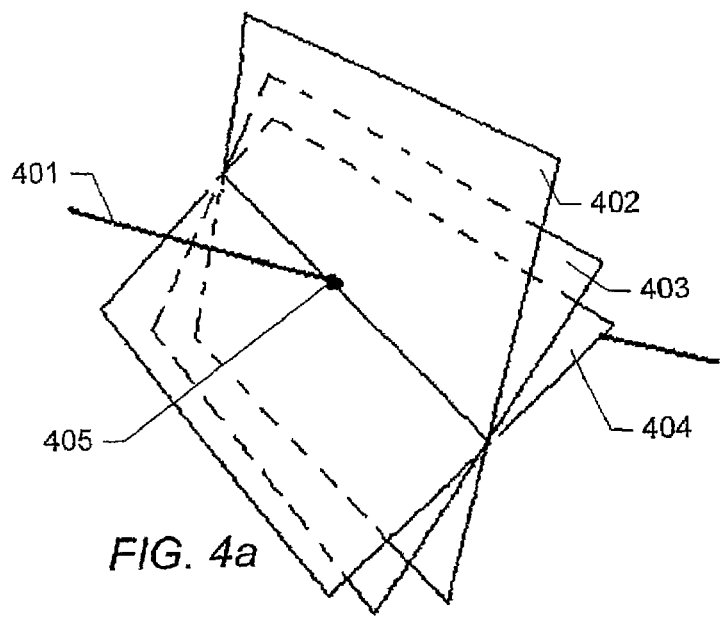
FIG. 4 illustrates an example of an embedding of a watermark in an expression that is related to a geometric expression.

FIG. 1 shows a schematic block diagram of a watermark embedding process. The process receives a source code 101 and a digital watermark 102 to be embedded in the source code.

The source code 101 is typically in the form in which a computer program has been written by a programmer, typically in a formal programming language such as C, C++, Java, or the like. The source code can be automatically compiled by a compiler into object code or machine code or executed by an interpreter.

The source code 101 may be represented as one or more text documents or as any other suitable digital representation. Alternatively, the watermarking process may receive a different type of input code in which mathematical expressions can be identified, e.g. object code.

The digital watermark 102 may be any suitable digital representation of the watermark information to be embedded, e.g. information identifying the recipient of the source code, the author of the source code, an identifier identifying the source code, a digital certificate, a pseudo-random number, a secret key, and/or any other suitable information. For example, the watermark may be represented as a bit sequence.

The source code is fed into a parser module 103. The parser module parses the source code and identifies suitable mathematical expressions. The parser module may use any suitable technique for parsing a source code known in the art, for example a subset of the techniques used by conventional compilers when parsing source code as to identify the structural components of the corresponding programming language, such as variable definitions, constant definitions, functions, program statements, conditions, loops, assignments, expressions, etc. From all the mathematical expressions identified in the source code, the parser may further select a predetermined subset of expressions as suitable expressions. Which expressions are suitable depend on the specific implementation of the watermarking scheme described herein. For example, in one embodiment, the parser module may identify all mathematical expressions that include a polynomial, or that can be reformulated to include a polynomial. In one embodiment, the parser may identify all comparisons in which two algebraic expressions are compared with each other. In yet another embodiment, the parser module may identify all expressions that express a certain type of a geometrical problem. Some specific examples of suitable mathematical expressions will be described in greater detail below. It is further understood that, in some embodiments, the parser may identify more than one type of mathematical expression. The parser module forwards the identified expressions 104, or at least pointers to their respective locations in the source code, to a code transformation module 105.

The digital watermark 102 is fed into an encoder module 106. The encoder module encodes the digital watermark according to a predetermined code. For example, the code 107 may comprise a set of code words such that each code word is represented by a specific mathematical transformation, by a specific mathematical expression and/or the like. For example, in one embodiment, each code word corresponds to an irreducible polynomial or a predetermined combination of polynomials. When the code 107 is an error correcting code, a code with a certain degree of redundancy, or the like, the subsequent detection of the embedded watermark becomes more reliable. Optionally the encoder module further receives information 110 from the parser module 103, e.g. information about the number of suitable expressions detected. In some embodiments, this information allows the encoder to adapt the encoding to the expressions identified, the number of expression identified, and/or the like. For example, the level of redundancy used in the encoding may be controlled based on the number of suitable expressions found. The more suitable expressions are identified, the higher the redundancy is that may be included in the encoded watermark.

In some embodiments, each codeword has associated with it a plurality of alternative transformations each being indicative of the corresponding codeword, and the encoder may select one of the alternative transformations based on the type of identified mathematical expressions. For example, if the identified expression involves a comparison of a polynomial with zero, the encoder may select a multiplication of the polynomial with a polynomial that has no real roots. In other types of expressions the transformation may involve multiplication and/or division with one or more polynomials having other properties, as will be illustrated in more detail below.

FIG. 3 illustrates a table that relates code words for encoding a watermark with respective mathematical transformations. In the example of FIG. 3, the relation between code words and mathematical transformations are represented by a table or 2-dimensional array, generally designated 300. Each row in the table corresponds to one of the code words, designated $CW_1, CW_2, \ldots, CW_N$, of the code used for encoding the watermark. Each column in the table corresponds to a type of expression, designated $E_1, E_2, \ldots, E_K$. Each cell in the table 300 identifies a specific transformation, designated $TF_{11}$, $TF_{12}, TF_{13}, \ldots, TF_{NK}$, to be used for a particular code word and a particular type of expression. For example, each cell may include a pointer to a specific function that implements the corresponding transformation, the coefficients for one or more polynomials, and/or the like.

For example, a type of expression may be a comparison of a polynomial expression with zero, another type may be an assignment of a variable with a polynomial expression, etc. Furthermore, for each type of expression, there may be one or more sub-types, e.g. polynomials in one variable, polynomials in two variables, conditions including an equality, conditions including an inequality, etc. Alternatively or additionally, the types of expression may be further subdivided according to any additional information that the parser may detect in the program code, e.g. limitations on the variable(s) involved in the expression, e.g. that the variables only may assume positive values, etc. Examples of such additional information will be described below.

It is understood that the above subtypes of expressions and/or additional information may alternatively be implemented as additional input parameters to the respective functions that implement the transformations. In yet another embodiment the table 300 may be represented as a higher dimensional array, e.g. a 3-dimensional array with indexes determined by the code word, the expression type, and by the additional information.

Again referring to FIG. 1, the encoded watermark 108 generated by the encoder module 106, e.g. a sequence of mathematical transformations, a sequence of polynomials, or the like, is fed into the transformation module 105.

The transformation module 106 receives the identified mathematical expressions 104 from the parser module 103 and the encoded watermark 108 from the encoder module 106. The transformation module then transforms the identified mathematical expressions according to the received encoded watermark. Examples of the transformations performed by the transformation module will be described in greater detail below. The transformations result in watermarked mathematical expressions which are inserted in the source code instead of the original identified expressions, thus resulting in a watermarked source code 109. The watermarked source code may subsequently be further processed, e.g. compiled, compressed, encoded, and/or the like.

FIG. 2 shows a schematic block diagram of a watermark detection/extraction process. The watermark extraction process receives a watermarked source code 209, or another type of watermarked input code as described above. The watermarked source code 209 is fed into a parser module 203 similar to the parser module 103 of the watermark embedding process described above. The parser module 203 identifies all potential candidate mathematical expressions, e.g. all expressions including a polynomial. As described above, which types of expressions are detected by the parser module depends on the specific implementation of the watermarking process. Alternatively, the parser module 203 may further receive the original, i.e. unmarked, program code and identify all expressions that differ from the unmarked code. As yet another example, the parser module 203 may further receive a list of locations in the program code at which transformations indicative of watermark information have been performed. Such a list may, for example be stored during the embedding process and stored in a watermark repository. The identified candidate expressions 204 are fed into an inverse transformation module 205. The inverse transformation module attempts to perform a number of predetermined candidate mathematical transformations, e.g. a reduction of the polynomials for example by attempting polynomial division of each of the identified polynomials by each of the polynomials of the code used in the encoding of the watermark. If the inverse transformation module fails to perform any of the predetermined set of candidate transformations, the identified candidate expression is disregarded as not watermarked. If one of the candidate transformations succeeds, the corresponding transformation is added to a list of identified transformations. Hence, after processing all candidate expressions, the inverse transformation module has generated a sequence of identified transformations 208 which is fed into a decoder module 206.

The decoder module 206 receives the sequence of identified transformations 208 and decodes the sequence based on the known code 207 that was used in the embedding process. When the decoding further comprises error detection or even error correction, the detection reliability is improved. The decoder thus generates a decoded watermark 202. In some embodiments, the decoded watermark is subsequently compared to a reference watermark or a list of reference watermarks in order to identify the embedded information.

In the following, different examples of suitable mathematical expressions for the embedding of watermarks are described in more detail as well as examples of corresponding transformations.

Polynomial Expressions:

As a first example, polynomial expressions are considered.

During the watermark embedding process, a number of instructions containing polynomial expressions are identified in the source code. Examples of suitable expressions include simple statements such as "if x=2", "while (x>2)", etc. Other examples may include more complex expressions such as "$y=x^3+4x^2+3x+2$". The identified polynomials are then substituted for an equivalent extended expression encoding some watermark information.

For example, transformations of the above example statements may be performed as follows:

$$\text{if } (x=2) <-> \text{if } (x-2=0) <-> \text{if } ((x-2)(x^2+x+4)=0)$$

$$<-> \text{if } (x^3-x^2+2x-8=0)$$

Hence, in this example, the expression "if (x=2)" is first transformed in a canonical form, i.e. the equality is brought into the form f(x)=0 with a polynomial f(x). Subsequently, the polynomial f(x) is multiplied with a polynomial g(x), where g(x) corresponds to one of a set of codewords that encode the watermark as described above. In this example, the code may consist of codewords that each correspond to a corresponding polynomial, such that all the codeword polynomials are irreducible polynomials without real roots. In the above example, the codeword polynomial is assumed to be $(x^2+x+4)$. Finally, the polynomials are multiplied with each other resulting in the watermarked expression "if $x^3-x^2+2x-8=0$".

In the example of the identified instruction "while x>2", a similar transformation process based on a codeword polynomial, e.g. $(x^2+x+4)$, may be performed, e.g. according to:

$$\text{while } (x>2) <-> \text{while } (x-2>0) <-> \text{while } ((x-2)(x^2+x+4)>0)$$

$$<-> \text{while } (x^3-x^2+2x-8>0).$$

Hence, in both the above examples, the expression used in the extension, i.e. $(x^2+x+4)$, encodes (part of) the watermark information.

If the identified expression corresponds to a variable assignment, where a variable is assigned with a polynomial, e.g. "y=x−2", the transformation may involve multiplication and division with one or more corresponding codeword polynomials such that the assigned value is not altered, e.g. according to:

$$y=x-2 <-> y=(x-2)(x+1)/(x+1) <-> y=(x^2-x-2)/(x+1)$$

Hence, in this example, the codeword polynomial is x+1.

In a more complicated example, the transformation may involve the following:

$$y = x - 2 = (x-2)(x+1)(x+2)(x+3)/[(x+1)(x+2)(x+3)]$$

$$= (x-2)(x+1)(x+2)(x+2)/[(x+1)(x+2)(x+3)] +$$

$$(x-2)(x+1)(x+2)/[(x+1)(x+2)(x+3)]$$

$$= (x-2)(x+2)(x+2)/(x+2)(x+3) +$$

-continued $$(x-2)(x+1)/(x+1)(x+3)$$

$$= (x^3+2x^2-4x-8)/(x^2+5x+6) +$$

$$(x^2-x-2)/(x^2+4x+3)$$

Hence, in this example, the expression "y=x−2" is replaced by the watermarked expression "$y=(x^3+2x^2-4x-8)/(x^2+5x+6)+(x^2-x-2)/(x^2+4x+3)$", and the codeword polynomial encoding (a part of) the watermark information was (x+1)(x+2)(x+3).

As yet another example, we consider to program code fragment

```
while (X<10) {
    X++;
}
```

This fragment includes two expressions that include, or at least can be expressed as, a polynomial, namely X<10 and X++, which represents the assignment X=X+1. The first expression may be watermarked using e.g. the codeword $X^2+X+2$ according to $$X<10 <-> X-10<0 <-> (X-10)(X^2+X+2)<0$$

$$<-> (X^3-9X^2-8X-20)<0$$

The second expression may be watermarked using e.g. the encoding polynomials $X^2+X+2$, $X+1$, $X+2$ according to $$X = X + 1 <->$$

$$X = (X^4+2X^3+2X^2+2X+1)/(X^3+2X^2+3X+2) +$$

$$(X^3+4X^2+5X+2)/(X^3+3X^2+4X+4)$$

Hence the above program code segment with the embedded watermark encoded by polynomials $(X^2+X+2)$, $X+1$, $X+2$ reads

```
while (X^3-9X^2-8X-20 < 0) {
    X = (X^4+2X^3+2X^2+2X+1) / (X^3+2X^2+3X+2) +
        (X^3+4X^2+5X+2) / (X^3+3X^2+4X+4);
}.
```

During subsequent watermark extraction, the extraction process may perform the following steps:
  Identify the expression(s) that may potentially have embedded therein information, e.g. $(X^4+2X^3+2X^2+2X+1)/(X^3+2X^2+3X+2)+(X^3+4X^2+5X+2)/(X^3+3X^2+4X+4)$ in the above example;
  Simplify the expression and identify the factors used to extend the expression, e.g. $(x^2+x+2)$, $(x+1)$, $(x+2)$ in the above example. For example, the extensions can be identified by comparing the code with the original un-marked code.
  Decode the information from the identified polynomials.

In the following, a number of methods are describe by means of which the embedded watermarks may further be protected against attacks.

Data Obfuscation:

An attacker might perform a data obfuscation attack in which the variable x is substituted, e.g. for x−a or a·x, i.e. by performing a variable translation and/or scaling. Such a substitution will affect the polynomials. Therefore, it is desirable to make the information in the polynomials resilient to translation and scaling of the variables.

An embodiment of an encoding method that considers this aspect is based on the roots of the polynomials used in the extension. If the roots are plotted in the complex plane, the resulting figure will be scaled and/or translated, if the variable is scaled and/or translated. Accordingly, in one embodiment, the information is encoded in the polynomials corresponding to the plot of the roots translated and scaled according to a set of predetermined rules. Examples of such rules include a predetermined scaling, e.g. such that the largest distance between two roots is 1, and a predetermined translation, e.g. such that the leftmost root is located on the real axis. However, it is understood that other suitable scalings, translations, and/or the like may be used. This method further provides the possibility of encoding the same data by extending it with different sets of polynomials, e.g. polynomials with scaled and/or translated variables.

Additive Attack:

Another possible attack is to further extend the polynomials, e.g. by inserting another watermark using the same method (a so-called additive attack). However, such an attack would not alter the fact that the original polynomials are present and would be detected during watermark extraction. By allowing only certain combinations of polynomials or by introducing other error correcting mechanisms, the watermark would still be recognized in such an attack. For example, each code word in the encoding of the watermark may be related to a predetermined combination of polynomials.

Simplification and Substitution:

An attack that uses a symbolic toolbox adapted to simplify mathematical expressions and substitute them by an equivalent simpler expression may potentially be successful, i.e. potentially able to remove the watermark. In the following, a number of methods will be described that make it difficult for an attacker to factor the expressions, to analyse the factors and to substitute the expressions by a simpler expression, thereby decreasing the risk for such an attack being successful:

1) Introducing Several Variables:

A simplification of the polynomial expressions requires a factorization, e.g. an expression of a polynomial f(x) as a product of two or more polynomials. The factorisation can be made more difficult to perform by introducing more than one variable in the expressions contain several variables. This may be achieved by identifying a variable in the mathematical expression, and substituting the identified variable by two (or more) variables. For example, in the expression z=2 the variable z may be replaced by a sum of two auxiliary variables according to the substitution z=x+y, thereby arriving at the expression x+y−2=0. Furthermore, the substitution involves modifying all statements in which z is updated to either update x or y (or both) accordingly. Finally, the expression is extended using polynomials containing several variables, e.g. as illustrated in the following example:

$$z=2 <-> x+y-2=0 <-> (x+y-2)((x-y)^2+1)=0$$

$$<-> x^3+2X^2y+\ldots-2=0.$$

This approach will be further illustrated by the following example:

Consider the Code Fragment

```
while (z<n){
    z++;
}
```

The code above may be marked by watermarking the expression z<n. In particular, in this example the variable z may be substituted by x+y, by transforming the expression z<n into x+y−n<0 and by extending the polynomial x+y−n with polynomials in x and y that encode (part of) the watermark. At the same time the statement z++ that causes an update, in this case an increment, of the value of z is replaced by a statement in which one of the variables x and y is updated accordingly. For example, the statement z++ may be transformed into

```
If (arbitrary condition)
    x++;
else
    y++;
```

Hence, irrespective of what condition is tested, one and only one of the variables x and y is incremented.

In summary, the above example code fragment may be watermarked by substituting it for

```
while ((x^3+4y^3-n^3+5*x^2y+x^2n+8xy^2-xn^2-3yn^2+2xyn)<0){
    if ((x^2+y^2)>n)
        x++;
    else
        y++;
}
```

Here $x^2+y^2>0$ is introduced as a dummy condition, as it does not matter whether the condition evaluates as TRUE or FALSE.

2) Using Hidden Information:

In some situations it may be known at watermarking time that a certain variable can only have certain values, e.g. only positive values, only integer values, only a certain limited set of numeric values, or the like. In such cases an expression can be extended so that the new expression corresponds to the original only for these values of that variable.

For example:

If it is known that z is an integer then z=2 is equivalent to $(z-2)(2z-1)=0 <-> 2z^2-5z+2=0$.

If it is known that z is a rational number then $z=2 <-> (z-2)(z^2-2)=0 <-> z^3-2z^2-2z+4=0$.

If it is known that z>0, then $z=2 <-> (z-2)(z+1)=0 <-> z^2-z-2=0$.

One way to use variables that only will assume certain values is to perform the extension inside a conditional statement which ensures that the variable only assumes the values in question, e.g. inside an "if z>0" block it is known that the variable z only assumes positive values.

Example

In the Code Fragment

```
while ((x+y)>0){
    if (x+y==1 ){
    ...
    }
}
```

The expression $x+y==1$ may be watermarked by transforming it such that the transformed expression is equivalent with $x+y==1$ only for $x+y>0$.

An example of such a transformation is if $(x+y==1) <-> $ if $((x+y-1)(x^2+y^2-2xy+x+1)==0)$ $<-> $ if $((x^3+y+3xy-x^2y-y^2-xy^2+y^3-1)==0)$ Even if an attacking tool factorises the expression $(x^3+y+3xy-x^2y-y^2xy^2+y^3-1)$ to obtain $(x+y-1)(x^2+y^2-2xy+x+1)$, the tool would still have to realize that the right parenthesis is larger than 0 since $x+y>0$.

3) Introducing Opaque Variables:

By adding a variable determined by an opaque predicate the extended expression can be made irreducible. Substituting the variable for the opaque value(s) in the watermark extraction process makes it possible to factor the expression.

Example: $(x^2-y)$ is irreducible, but if y is substituted for 1 then $(x^2-1)=(x-1)(x+1)$. Consequently, given an opaque predicate $y=1$, then the statement "if $(x=1)$" can be transformed as follows:

if $(x=1) <-> $ if $(x^3-x^2y+xy^2-y^3=0)$.

Similarly, assuming an opaque predicate $z=0$, then the statement "if $(x=1)$" can be transformed as follows:

if $(x=1) <-> $ if $(-1+x-x^2+x^3+x*z-x^2*z-z=0)$.

4) Introducing Noise:

An extended multivariate polynomial can be made irreducible by adding noise to the coefficients in the polynomial, i.e. by slightly changing one or more of the coefficients. This approach changes the original expression so the embedding process needs to ensure that the program behaviour does not change. However, the approach can be useful in many situations, e.g. if it is known that a variable only takes integer values and the program statement includes a conditional statement wherein an inequality is checked, e.g. as illustrated by the following example:

while $(x-2>0) <-> $ while $(x^3-x^2+2x-8>0)$ $<-> $ while $(x^3-x^2+2x-9>0)$ (if x is an integer).

The above approach relies on that the code to be watermarked includes a number of polynomial expressions. In the following it will be described how other instructions may be transformed as to include polynomial expressions and, thus, be used for the purpose of watermarking according to the above-described scheme. Below a number of examples are given of instructions that may be implemented using polynomials expressions:

Simple Comparisons:

if $(x=2) <-> $ if $(x-2=0)$ if $(x>2) <-> $ if $(x-2>0)$

Logical Expressions:

In the following expressions, "|" represents the logical OR operator and "&" the logical AND operator.

| | |
|---|---|
| if (x=2 \| x=4) | $<-> $ if $( (x-2)(x-4)=0 )$ |
| | $<-> $ if $(x^2-6x+8=0)$ |
| if (x=2 & y= 4) | $<-> $ if $( (x-2)^2+(y-4)^2=0 )$ |
| | $<-> $ if $(x^2+y^2-8y-2x+20=0)$ |
| if( (2<x) & (x<4) ) | $<-> $ if $x^2-6x+8<0$ |

Furthermore, elementary functions can be approximated to arbitrary precision by a series expansion using polynomials, e.g. $\sin(x)=x-x^3/6+x^5/120+\ldots$.

In some embodiments, the watermarking process inserts new dummy instructions that encode the watermark. For example, the condition $(x^2+y^2-2xy+2x-2y+2)>0$ will always evaluate to true and may consequently be inserted anywhere in the code.

In the above, a watermarking method has been described in which information is embedded into program code by replacing mathematical expressions that include a polynomial (or that can be transformed into an expression including a polynomial) by an equivalent expression that includes an extended polynomial, i.e. a polynomial that can be factorised such that one of the factors is the original polynomial.

In the following, a more general approach will be described that does not rely on polynomial expressions. According to this generalised approach mathematical expressions are substituted for equivalent expressions other than polynomials.

Creating Equivalent Algebraic Expressions:

Below follow examples of expressions that may be transformed into equivalent expressions that have watermark information embedded therein (in the following "|..|" represents the absolute value):

| | |
|---|---|
| if (x=2) | $<-> $ if $(\| x-1\| - \|x-3\| = 0)$ |
| if (x=2 \| x=4) | $<-> $ if $(\|x-3\| -1 =0)$ |
| if (x=2 & y=4) | $<-> $ if $(\|x-2\| + \|y-4\|=0)$ |
| if (2<x & x<4) | $<-> $ if $(\|x-3\| - 1<0)$ |
| | $<-> $ if $(\|x-2\|+\|x-4\|-2=0)$ |
| if (x even) | $<-> $ if $(\sin(pi*x/2)=0)$ |
| | $<-> $ if $(\sin(pi*x/2)-\sin(pi*x)/2=0)$ |
| if (x>=0 \| y>=0) | $<-> $ if $(xy+\|x\|y+x\|y\|+\|xy\|=0)$ |
| if (x>=0 & y>=0) | $<-> $ if $(\|x\|+\|y\|-x-y=0)$ |
| | $<-> $ if $x^2+y^2-x\|x\|-y\|y\|=0$ |
| if (2<x<4 & 1<y<3) | $<-> $ if $(x^2-6x+8<0$ & $y^2-4y+3<0)$ |
| | $<-> $ see example above |

Here it is noted that $(x<0|y<0) <-> !(x>=0 \& y>=0)$, and if $(x<0|y<0) <-> $ if $(x^2+y^2-x|x|-y|y|=0)$ As was described in connection with polynomial expressions, if additional information is available at watermarking time about the possible values of a variable x, the watermarking process can create equivalent expressions that are only valid for these values of x.

For example, if at watermarking time it is known that x>0, the following transformation is possible:

if $(x=3) <-> $ if $(|x-1|-2=0)$.

As another example, if at watermarking time it is known that x is an integer, the following transformation is possible:

if $(x=3) <-> $ if $|4x-7|-5=0$.

Furthermore, expressions such as "if (x=2)" may be substituted by complex expressions involving e.g. exponentials, logarithms, and/or trigonometric functions. For example:

| | |
|---|---|
| if (x=2) | <-> if $(\ln(x+2)/\ln(2)-2^x+2=0)$, (assuming x>0) |
| if (x=0 \| x=1) | <-> if $(2^x-\mathrm{sqrt}(x)-1=0)$ |
| if (x=-1 \| x=1) | <-> if $(\sin(\mathrm{pi}^*x)/\log(x^2)!=0)$, (assuming x is an integer) |
| if (0<x<1) | <-> if $(2^x-\mathrm{sqrt}(x)-1 <0)$ |
| if (-1<x<1) | <-> if $(\sin(\mathrm{pi}^*x)/x-x^2/4<0)$. |

FIG. 4 illustrates an example of an embedding of a watermark in an expression that is related to a geometric expression.

In some embodiments the watermarking process may utilise expressions that describe geometric problems; e.g. the solution (i.e. a point in space) of the intersection of a line and a (non-parallel) plane in 3-dimensional space. This is illustrated in FIG. 4a which shows a line 401 intersecting different planes 402, 403, and 404 in the same point 405.

Figure 4B:
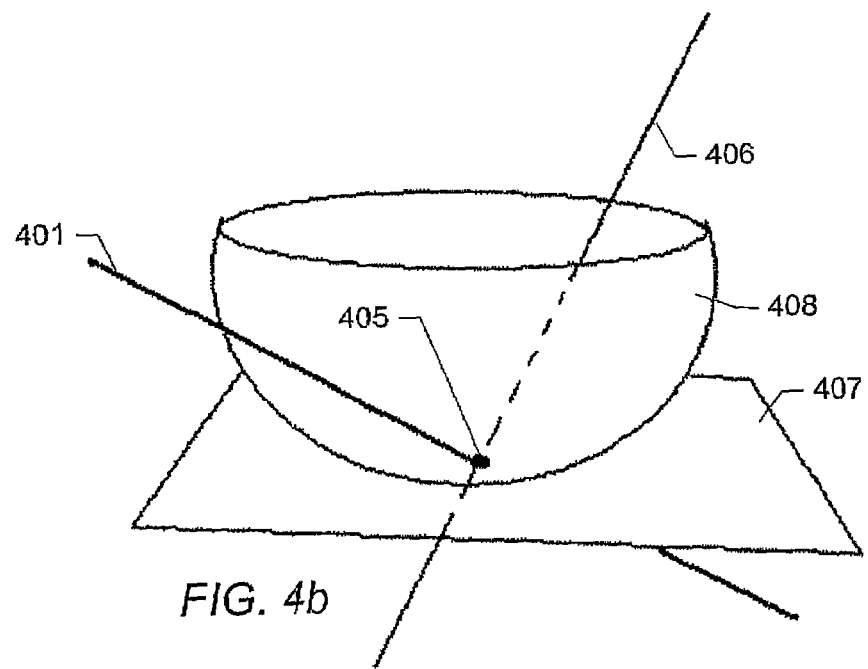

In a computer program code, the point of intersection in (n-dimensional) space is typically determined by a set of expressions that describe different geometric objects. However, the same intersection may arise from different formulations of the intersection problem. For example, FIG. 4b illustrates three different formulations, based on a line 406, a plane 407, and a curved manifold 408, respectively, that all result in the same point of intersection.

Furthermore, a given intersection problem can be embedded in a higher dimensional space making it hard to determine the original formulation of the problem. Also, a point in e.g. a space over a finite field, can be embedded in an affine or symplectic space. All these latter approaches are logically similar to the approach of expanding a polynomial.

In the above examples, the watermark may thus be encoded by the choice/formulation of the intersection problem.

In summary, disclosed herein is a method of embedding information in a computer program code, the computer program code comprising a plurality of program statements, each statement being adapted to cause a data processing system to produce a predetermined result, the method comprising:
parsing the computer program code as to identify at least one program statement that includes a first mathematical expression; wherein said first mathematical expression includes at least a first algebraic expression adapted to cause, when executed on a data processing system, the data processing system to generate at least one numeric result;
replacing said first mathematical expression in the identified program statement by a transformed mathematical expression to obtain a watermarked program statement, wherein the transformed mathematical expression includes a transformed algebraic expression instead of the first algebraic expression, such that the watermarked program statement is adapted to cause, when executed on a data processing system, the data processing system to produce the same result as the identified program statement, and wherein the transformed mathematical expression includes at least a part of said information.

The methods described herein provide a watermarking process that generates watermarks that are difficult to remove by automatic tools such as obfuscation and code optimization. Furthermore, it would require a prohibitive effort to manually analyse the code and substitute back the original expressions.

Although some embodiments have been described and shown in detail, the invention is not restricted to them, but may also be embodied in other ways within the scope of the subject matter defined in the following claims.

In particular, the embodiments have mainly been described in connection with embedding a digital watermark. However, it is understood that the methods described herein may equally be applied to the embedding of any other type of information.

The method, product means, and device described herein can be implemented by means of hardware comprising several distinct elements, and by means of a suitably programmed microprocessor. In the device claims enumerating several means, several of these means can be embodied by one and the same item of hardware, e.g. a suitably programmed microprocessor, one or more digital signal processor, or the like. The mere fact that certain measures are recited in mutually different dependent claims or described in different embodiments does not indicate that a combination of these measures cannot be used to advantage.

It should be emphasized that the term "comprises/comprising" when used in this specification is taken to specify the presence of stated features, integers, steps or components but does not preclude the presence or addition of one or more other features, integers, steps, components or groups thereof.

The invention claimed is:

1. A method of embedding information in a computer program code, the computer program code comprising a plurality of program statements executable by a computer processor, the method comprising:
parsing the computer program code as to identify at least one program statement that includes a first mathematical expression, the program statement, when executed by the computer processor, causes a data processing system to evaluate the first mathematical expression as to produce a result, wherein said first mathematical expression includes at least a first algebraic expression that produces at least one numeric result;
generating a modified mathematical expression by performing a predetermined transformation of the first mathematical expression, wherein the modified mathematical expression includes a transformed algebraic expression instead of the first algebraic expression, such that the modified mathematical expression produces the same result as the first mathematical expression, wherein the transformed algebraic expression is generated by combining an algebraic expression derived from the first algebraic expression with an auxiliary algebraic expression, wherein the algebraic expression is indicative of at least a part of said information;
replacing said first mathematical expression in the identified program statement by the modified mathematical expression, wherein the modified mathematical expression is indicative of at least a part of said information;
encoding the information to be embedded according to one or more code words, each code word represented by one or more respective predetermined transformations of a specific mathematical expression, wherein the encoding generates an encoded watermark; and
wherein the generating the modified mathematical expression comprises performing the predetermined transformation of the first mathematical expression based on the encoded watermark.

2. The method according to claim 1, further comprising parsing the first algebraic expression as to identify at least a first variable and replacing said first variable by a combination of at least two variables.

3. The method according to claim 2, wherein the combination of at least two variables is a linear combination of said at least two variables.

4. The method according to claim 1, wherein the first algebraic expression includes at least one variable and wherein said modified mathematical expression produces the same result as the first mathematical expression only for a predetermined subset of values of said at least one variable.

5. The method according to claim 1, wherein the identified program statement evaluates said first mathematical expression as an integer data type and wherein said modified mathematical expression produces a floating point result that results in the same numerical result as the evaluation of the first mathematical result only when converted into an integer data type.

6. The method according to claim 1, wherein encoding the information comprises encoding the information using an error correcting code.

7. The method according to claim 1, wherein the first mathematical expression includes a comparison of a first and a second algebraic expression that causes a data processing system to compare the results of the first and second algebraic expressions and wherein generating the modified mathematical expression includes replacing at least one of the first and second algebraic expressions by respective first and second transformed algebraic expressions.

8. The method according to claim 7, wherein the first mathematical expression includes a first condition equivalent to a comparison of a first polynomial with zero; and
wherein generating the modified mathematical expression includes replacing the first condition by a comparison of a transformed polynomial with zero, wherein the transformed polynomial is reducible as a product of at least the first polynomial and a second polynomial.

9. The method according to claim 7, wherein the first mathematical expression includes a first condition equivalent to a comparison of a first polynomial with zero; and
wherein generating the modified mathematical expression includes replacing the first condition by a comparison of a transformed polynomial with zero, wherein the transformed polynomial includes an auxiliary variable having a corresponding opaque value determined by a predetermined opaque predicate, and where the transformed polynomial is reducible as a product of at least the first polynomial and a second polynomial only when the auxiliary variable is substituted by its opaque value.

10. The method according to claim 8, wherein the second polynomial has no real roots.

11. The method according to claim 1, wherein said information comprises a digital watermark.

12. The method according to claim 1, wherein said first mathematical expression is at least part of a program statement that causes, when executed on a data processing system, the data processing system to generate at least one result having a numeric data type or a Boolean data type.

13. The method according to claim 12, wherein the polynomial has one or more roots in the complex plane, and wherein the information is encoded in the polynomial based on a location of the roots in the complex plane.

14. The method according to claim 1, wherein the first algebraic expression represents a geometric intersection problem.

15. The method according to claim 1, further comprising loading the computer program code into a memory of a computer.

16. A data processing system for embedding information in a computer program code, the computer program code comprising a plurality of program statements, the data processing system further comprising:
a computer processor; and
a non-transitory computer-readable storage medium further comprising computer-readable instructions, when executed by the computer processor, are configured to:
parse the computer program code as to identify at least one program statement that includes a first mathematical expression, the program state, when executed by the computer processor, causes the data processing system to evaluate the first mathematical expression as to produce a result, wherein said first mathematical expression includes at least a first algebraic expression that produces at least one numeric result,
generate a modified mathematical expression by performing a predetermined transformation of the first mathematical expression, wherein the modified mathematical expression includes a transformed algebraic expression instead of the first algebraic expression, such that the modified mathematical expression produces the same result as the first mathematical expression, wherein the transformed algebraic expression is generated by combining an algebraic expression derived from the first algebraic expression with an auxiliary algebraic expression, wherein the algebraic expression is indicative of at least a part of said information,
replace said first mathematical expression in the identified program statement by the modified mathematical expression, wherein the modified mathematical expression is indicative of at least part of said information,
encode the information to be embedded according to one or more code words, each code word represented by one or more respective predetermined transformations of a specific mathematical expression, wherein the encoding generates an encoded watermark, and
wherein generating the modified mathematical expression comprises performing the predetermined transformation of the first mathematical expression based on the encoded watermark.

17. A method of detecting information embedded in a computer program code, the computer program code comprising a plurality of program statements, the method comprising:
parsing the computer program code as to identify at least one program statement that includes a first mathematical expression, the program statement, when executed by a computer processor, causes a data processing system to evaluate the first mathematical expression as to produce a result wherein said first mathematical expression includes at least a first algebraic expression that produces at least one numeric result;
performing at least a first one of a predetermined set of transformations of said first mathematical expression, wherein the transformation includes replacing said first algebraic expression with a transformed algebraic expression different from the first algebraic expression, wherein the transformed algebraic expression is generated by combining an algebraic expression derived from the first algebraic expression with an auxiliary algebraic expression, wherein the algebraic expression is indicative of at least a part of said information;

determining whether said first transformation results in a transformed mathematical expression that produces the same result as the first mathematical expression, wherein the first transformation of the first mathematical expression is performed based on an encoded watermark;

if said first transformation results in a transformed mathematical expression that produces the same result as the first mathematical expression, adding the first transformation to a sequence of identified transformations; and decoding the sequence of identified transformations based on a predetermined code, wherein the predetermined code corresponds to at least one of the predetermined set of transformations.

18. The method according to claim 17, wherein said information comprises a digital watermark.

19. The method according claim 17, wherein said first mathematical expression is at least part of a program statement that causes, when executed on a data processing system, the data processing system to generate at least one result having a numeric data type or a Boolean data type.

20. The method according to claim 19, wherein the numeric data type is a floating point data type or an integer type.

21. The method according to claim 17 wherein the first algebraic expression includes a polynomial.

22. The method according to claim 21, wherein the polynomial has one or more roots in the complex plane, and wherein the information is encoded in the polynomial based on a location of the roots in the complex plane.

23. The method according to claim 17, wherein the first algebraic expression represents a geometric intersection problem.

24. The method according to claim 17, further comprising loading the computer program code into a memory of a computer.

25. A data processing system for detecting information embedded in a computer program code with a plurality of program statements, the data processing system comprising:

a computer processor; and a non-transitory computer-readable storage medium further comprising computer-readable instructions, when executed by the computer processor, are configured to:

parse the computer program code to identify at least one program statement that includes a first mathematical expression, the program statement, when executed by the computer processor, causes the data processing system to evaluate the first mathematical expression as to produce a result wherein said first mathematical expression includes at least a first algebraic expression that produces at least one numerical result, perform at least a first one of a predetermined set of transformations of said first mathematical expression, wherein the transformed algebraic expression is generated by combining an algebraic expression derived from the first algebraic expression with an auxiliary algebraic expression, wherein the algebraic expression is indicative of at least part of said information, determine whether said first transformation results in a transformed mathematical expression that produces the same result as the first mathematical expression, wherein the first transformation of the first mathematical expression is performed based on an encoded watermark;

add the first transformation to a sequence of identified transformations, if said first transformation results in a transformed mathematical expression that produces the same result as the first mathematical expression, decode the sequence of identified transformations based on a predetermined code, wherein the predetermined code corresponds to at least one of the predetermined set of transformations.

\* \* \* \* \*

UNITED STATES PATENT AND TRADEMARK OFFICE
CERTIFICATE OF CORRECTION

PATENT NO. : 8,321,689 B2  Page 1 of 1
APPLICATION NO. : 11/721666
DATED : November 27, 2012
INVENTOR(S) : Smeets et al.

It is certified that error appears in the above-identified patent and that said Letters Patent is hereby corrected as shown below:

In the Specification:

In Column 1, Line 59, delete "too" and insert -- to --, therefor.

In Column 3, Line 13, delete "type," and insert -- type; --, therefor.

In Column 8, Line 16, delete "106" and insert -- 105 --, therefor.

In Column 13, Line 26, delete " $3xy-x^2y-y^2xy^2+y^3-1)$ " and insert -- $3xy-x^2y-y^2-xy^2+y^3-1)$ --, therefor.

In the Claims:

In Column 19, Line 19, in Claim 19, delete "according" and insert -- according to --, therefor.

Signed and Sealed this
Eighteenth Day of June, 2013

Teresa Stanek Rea
*Acting Director of the United States Patent and Trademark Office*